United States Patent
Goldberg et al.

(10) Patent No.: US 9,645,745 B2
(45) Date of Patent: May 9, 2017

(54) I/O PERFORMANCE IN RESILIENT ARRAYS OF COMPUTER STORAGE DEVICES

(71) Applicant: International Business Machines Corporation, Armonk, NY (US)

(72) Inventors: Tomer Goldberg, Givataim (IL); Rivka M. Matosevich, Zichron-Yaacov (IL); Barak Pinhas, Givatayim (IL); Amichai Schreiber, Modiin (IL)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 14/633,839

(22) Filed: Feb. 27, 2015

(65) Prior Publication Data
US 2016/0253092 A1 Sep. 1, 2016

(51) Int. Cl.
G06F 12/00 (2006.01)
G06F 13/00 (2006.01)
G06F 3/06 (2006.01)
G06F 11/00 (2006.01)

(52) U.S. Cl.
CPC ............. *G06F 3/061* (2013.01); *G06F 3/064* (2013.01); *G06F 3/067* (2013.01); *G06F 3/0611* (2013.01); *G06F 3/0665* (2013.01); *G06F 3/0689* (2013.01); *G06F 11/00* (2013.01)

(58) Field of Classification Search
None
See application file for complete search history.

(56) References Cited

U.S. PATENT DOCUMENTS

| | | | |
|---|---|---|---|
| 4,942,579 A | 7/1990 | Goodlander et al. | |
| 5,202,979 A | 4/1993 | Hillis et al. | |
| 5,790,774 A | 8/1998 | Sarkozy | |
| 6,289,471 B1 | 9/2001 | Gordon | |
| 6,839,803 B1 | 1/2005 | Loh et al. | |
| 7,502,886 B1 | 3/2009 | Kowalchik et al. | |
| 8,473,678 B1 | 6/2013 | Rajasekaran et al. | |
| 2013/0073702 A1* | 3/2013 | Umbehocker | G06F 9/5016 709/222 |
| 2015/0347451 A1* | 12/2015 | Lee | G06F 17/30194 707/610 |
| 2015/0363438 A1* | 12/2015 | Botelho | G06F 11/1456 707/692 |

OTHER PUBLICATIONS

Harker, John, "Tiered Storage Design Guide", Sep. 2010, © Hitachi Data Systems Corporation 2010, <http://www.hds.com/assets/pdf/hitachi-tiered-storage-options-design-guide.pdf >.
Raghavan et al., "Tiera: Towards Flexible Multi-Tiered Cloud Storage Instances", Department of Computer Science and Engineering University of Minnesota Twin Cities, Jan. 13, 2014, <http://www.cs.umn.edu/tech_reports_upload/tr2014/14-003.pdf>.

* cited by examiner

*Primary Examiner* — Sean D Rossiter
(74) *Attorney, Agent, or Firm* — Bryan D. Wells; David M. Quinn

(57) ABSTRACT

Storing computer data is provided. Responsive to determining that a first data includes user data, storing the user data to a first storage system, wherein the first storage system provides a first quality of service. Responsive to determining that a second data includes redundant data, storing the redundant data to a second storage system, wherein the second storage system provides a second quality of service that is lower than the first quality of service provided by the first storage system.

20 Claims, 6 Drawing Sheets

I/O PERFORMANCE IN RESILIENT ARRAYS OF COMPUTER STORAGE DEVICES

BACKGROUND OF THE INVENTION

The present invention relates generally to the field of computer data storage, and more particularly to resilient data storage on heterogeneous arrays of computer storage devices.

Heterogeneous arrays of computer storage devices may include two or more different types of computer storage devices and may provide one or more quality of service (QoS) levels. In the field of computer data storage, factors that may affect QoS include bandwidth, latency, and queue depth. The QoS of an array of computer storage devices may be based, at least in part, on the type(s) of storage devices on which the data resides. A heterogeneous array of computer storage devices may provide different QoS levels by segregating the computer storage devices into two or more homogeneous tiers. Each homogeneous tier may comprise a single type of computer storage device. Accordingly, each tier may have characteristics including capacity, latency, throughput, accessibility, reliability, and resiliency.

In the field of computer data storage, creating and storing redundant copies of data may increase resiliency. For example, mirroring replicates original data, thereby creating a mirror copy that is redundant data. Redundant data may be accessible if the original data is corrupted or otherwise inaccessible. Redundant data may be stored on one or more computer storage devices that are physically separate from the computer storage device(s) that contain the original data. As a result, redundant data may be accessible if the computer storage device(s) containing the original data fail.

Similarly, error-correcting codes may provide increased resiliency and allow corrupted or inaccessible data to be identified and, in some cases, subsequently corrected or reconstructed. A computer system may employ a mathematical function to generate redundant data from original data. Depending on the mathematical relationship between the original data and the redundant data, the redundant data may contain an equal number of data bits, more data bits, or fewer data bits than the original data. In addition, a redundant data bit may be a complex function of one or more original data bits. If an error is detected, it may be possible to correct the error or reconstruct the data depending on the error-correcting code used. Storing the redundant data on one or more computer storage devices that are physically separate from the computer storage device(s) that contain the original data may provide additional resiliency.

SUMMARY

According to one embodiment of the present disclosure, a method for storing computer data is provided. The method includes, responsive to determining, by one or more processors, that a first data includes user data, storing, by one or more processors, the user data to a first storage system, wherein the first storage system provides a first quality of service; and responsive to determining, by one or more processors, that a second data includes redundant data, storing, by one or more processors, the redundant data to a second storage system, wherein the second storage system provides a second quality of service that is lower than the first quality of service provided by the first storage system.

According to another embodiment of the present disclosure, a computer program product for storing computer data is provided. The computer program product comprises a computer readable storage medium and program instructions stored on the computer readable storage medium. The program instructions include program instructions to determine if data includes user data; program instruction to store the user data to a first storage system, wherein the first storage system provides a first quality of service; program instructions to determine if data includes redundant data; and program instructions to store the redundant data to a second storage system, wherein the second storage system provides a second quality of service that is lower than the first quality of service provided by the first storage system.

According to another embodiment of the present disclosure, a computer system for storing computer data is provided. The computer system includes one or more computer processors, one or more computer readable storage media, and program instructions stored on the computer readable storage media for execution by at least one of the one or more processors. The program instructions include program instructions to determine if data includes user data; program instruction to store the user data to a first storage system, wherein the first storage system provides a first quality of service; program instructions to determine if data includes redundant data; and program instructions to store the redundant data to a second storage system, wherein the second storage system provides a second quality of service that is lower than the first quality of service provided by the first storage system.

DETAILED DESCRIPTION

Figure 1:
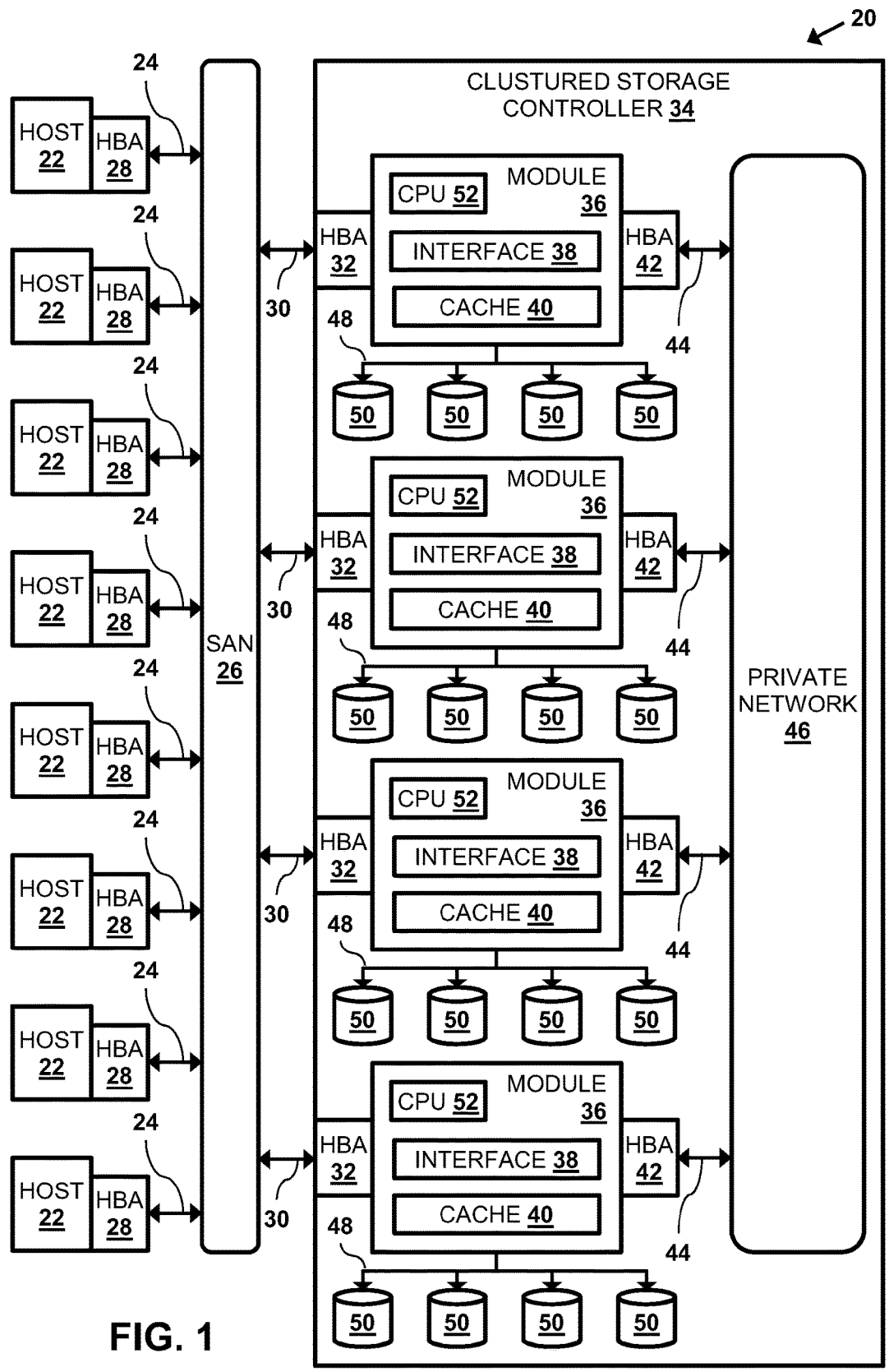
FIG. 1 is a block diagram that schematically illustrates a storage system comprising a storage controller, in accordance with an embodiment of the present invention.

Embodiments of the present disclosure enable storage of user data and redundant data on a heterogeneous array of computer storage devices. Embodiments of the present disclosure may provide a quality of service (QoS) that is primarily determined by high performance computer storage media that stores user data. This QoS may be provided at a reduced financial cost compared to an equivalent homogeneous array of computer storage devices that provides a similar QoS and incorporates the high performance computer storage media.

An array of computer storage devices provides a QoS to users who read data from, or write data to, the array of computer storage devices. Factors that determine the QoS of an array of computer storage devices may include latency, bandwidth, and queue depth. Reducing latency may improve the QoS of an array of computer storage devices. For example, replacing or augmenting storage media with higher performance storage media having faster read and/or write times may reduce the latency of an array of computer storage devices. In general, however, storage media with fast read and/or write times may be significantly more expensive than storage media with slower read and/or write times. For example, solid-state drives (SSDs) may have significantly faster read and/or write times than spinning hard disk drives (HDDs), but SSDs may also be significantly more expensive than HDDs. A homogenous array of SSDs may provide a high QoS, but the high cost of SSDs, and other similarly fast storage media known in the art, may make such an array cost prohibitive. Embodiments of the present disclosure may enable an array of computer storage devices to provide a QoS that is similar to a homogenous array of high performance computer storage devices, such as SSDs, but at lower cost.

Incorporating expensive, fast storage media, such as SSDs, and cheaper, slower storage media, such as HDDs, into an array of computer storage devices may offer advantages over a homogenous arrays of computer storage devices of either SDDs or HDDs. An array of computer storage devices that incorporates two or more types of storage media may be referred to as a heterogeneous array of computer storage devices. Embodiments of the present disclosure include a heterogeneous array of computer storage devices that may segregate its constituent computer storage devices into one or more tiers. In such embodiments, each tier may include storage media of a certain type. For example, an array of computer storage devices that includes both SSDs and HDDs may include a "high" tier of SSDs having relatively fast average read and/or write speeds and a "low" tier of HDDs having slower average read and/or write speeds. A heterogeneous array of computer storage devices may, however, have a limited amount of storage space on the high tier. As a result, it may be beneficial to allocate the higher performance storage media to data that is read from or written to the heterogeneous array of computer storage devices most often. Increased costs in terms of dollars per unit of storage space of the faster computer storage devices on the high tier may be offset by greater efficiency in terms of inputs/outputs (I/Os) per unit time, I/Os per dollar, and I/Os per unit of storage space. Similarly, it may be beneficial to allocate the lower performance storage media to data that is read from or written to the heterogeneous array of computer storage devices less often. Increased latency associated with the lower performance storage media on the low tier may be offset by fewer I/Os per unit of time. Increased latency may also be offset by decreased costs in terms of dollars per unit of storage space of the lower performance storage media.

An array of computer storage devices may store redundant data to provide resiliency for user data stored on the array of computer storage devices. Redundant data may be created using a variety of techniques that are well known in the art. For example, creating and storing "mirror" copies of original, user data may provide redundancy. A single computer storage device may store user data and one or more mirror copies of the user data. If the user data is corrupted, a computer system may be able to access and read the mirror copies. Storing user data and one or more mirror copies on the same computer storage device, however, may not provide resiliency if the computer storage device fails. Resiliency may be increased by storing mirror copies on one or more computer storage devices that are physically separate from the computer storage device(s) that store the user data. If the computer storage device(s) that store the user data fail, or the user data is otherwise inaccessible, the user data may be able to be recovered by reading one or more of the mirror copies from a separate computer storage device. While mirror copies may provide resiliency, each mirror copy requires as much storage space as the user data from which it is created. A computer system, however, may write mirror copies as it would user data without the resource overhead associated with calculating error-correcting codes, as discussed in more detail below. Therefore, creating mirror copies may be advantageous when efficiency in terms of I/Os per unit of time is more important than minimizing the cost of an array of computer storage devices.

Error-correcting codes may also provide increased resiliency through redundant data. Numerous error-correcting codes are well known in the art and include, but are not limited to, parity codes, hamming codes, Reed-Solomon codes, low-density parity-check codes, and turbo codes. Like mirror copies, an error-correcting code may enable a computer system to recover user data that is corrupted or otherwise inaccessible. Error-correcting codes add redundancy by generating redundant data bits. A single redundant data bit may be a complex function of one or more original, user data bits. Alternatively, multiple redundant data bits may be a complex function of multiple original user data bits. The mathematical relationship between an individual redundant data bit and one or more user data bits, however, may vary widely between different error-correcting codes. As a result, the ability to reconstruct user data from redundant data bits, the number of redundant data bits, the resource overhead associated with calculating the redundant data bits from user data, and/or the penalty on write operations, if any, may also vary between error-correcting codes. User data may or may not appear in the encoded output depending upon the error-correcting code in use. While generating error-correcting codes may require more resource overhead than generating mirror copies of user data, some error-correcting codes provide redundant data bits that occupy less space on a computer storage device or array of computer storage devices than one or more mirror copies that provide similar resiliency, as discussed in more detail below. Therefore, utilizing an error-correcting code to increase resiliency may be advantageous when data storage efficiency in terms of dollars per unit of storage space is more important than data storage efficiency in terms of I/Os per unit of time.

While redundant data may increase resiliency, a computer system may read redundant data much less frequently than user data. Some computer systems may only read redundant data during data recovery procedures. For example, an array of computer storage devices may need to read redundant data only when a computer storage device fails. Computer storage device failures, however, may be orders of magnitude more rare than host reads from user data. Moreover, rebuilding a computer storage device from redundant data may occur in the "background" on an array of computer storage devices. This process may be transparent to users. Therefore, it may be advantageous to include at least two types of computer storage devices in a heterogeneous array of computer storage devices. Redundant data may be stored on a low tier of cheap, slow computer storage media, and user data may be stored on a high tier of more expensive, faster computer storage media. Allocating data to a low and a high tier in this manner may allow a heterogeneous array of computer storage devices to provide a QoS with respect to host reads that is primarily determined by the latency associated with reading from the high tier of the more expensive, faster computer storage media. The heterogeneous array of computer storage devices may provide this QoS at lower cost than a homogenous array of the more expensive, faster computer storage media because the redundant data is stored on the cheaper, slower computer storage media. Because the redundant data is read much less frequently than the user data, the redundant data may be stored on the cheaper, slower computer storage media without significantly affecting the QoS of the heterogeneous array of computer storage devices with respect to read operations.

Unlike read operations, write operations may occur with similar frequency with respect to user data and redundant data. Write acceleration, however, may enable a heterogeneous array of computer storage devices to "hide" the relatively high latency of the low tier of cheap, slow computer storage media. Write acceleration allows a computer system to reduce the apparent latency of write operations to persistent storage media by acknowledging writes before data is destaged from buffers. Using this technique, actual write operations to persistent storage generally occur in the background and may be transparent to users. As a result, the higher latency associated with the low tier of cheap, slow computer storage media may not significantly affect the QoS of a heterogeneous array of computer storage devices with respect to apparent write latency. Similarly, a computer system may generate copies and error-correcting codes in the background. Consequently, these operations may not significantly affect the QoS of a heterogeneous array of computer storage devices with respect to apparent write latency.

Embodiments of the present disclosure will now be described in detail with reference to the Figures.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a storage processor 52, an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

While the configuration in FIG. 1 shows storage controller 34 comprising four storage modules 36 and each of the modules coupled to four storage devices 50, a given storage controller 34 comprising any multiple of storage modules 36 coupled to any plurality of storage devices 50 is considered to be with the spirit and scope of the present invention.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
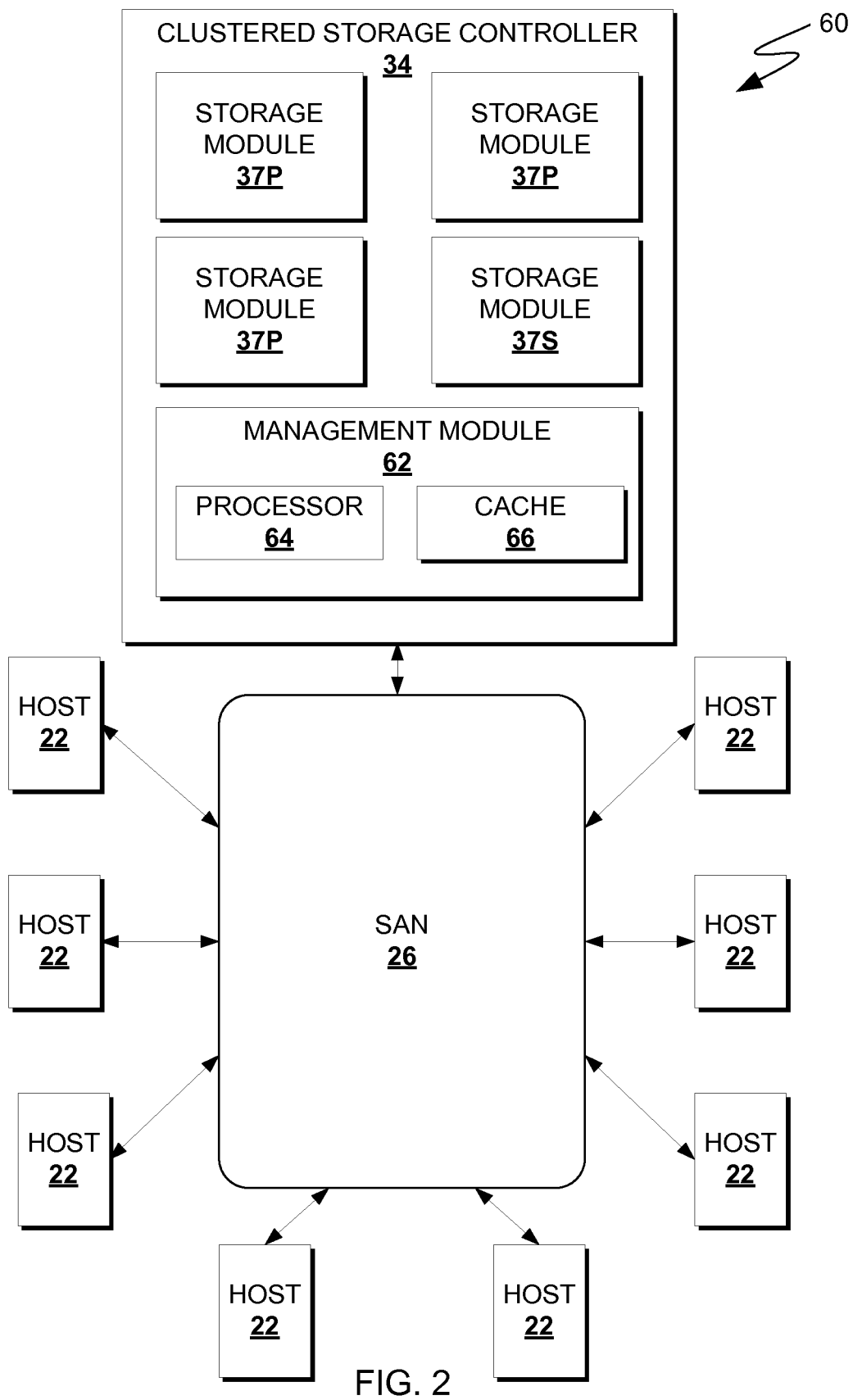
FIG. 2 is a block diagram that illustrates a storage system with primary and secondary storage modules, in accordance with an embodiment of the present disclosure.
Figure 3:
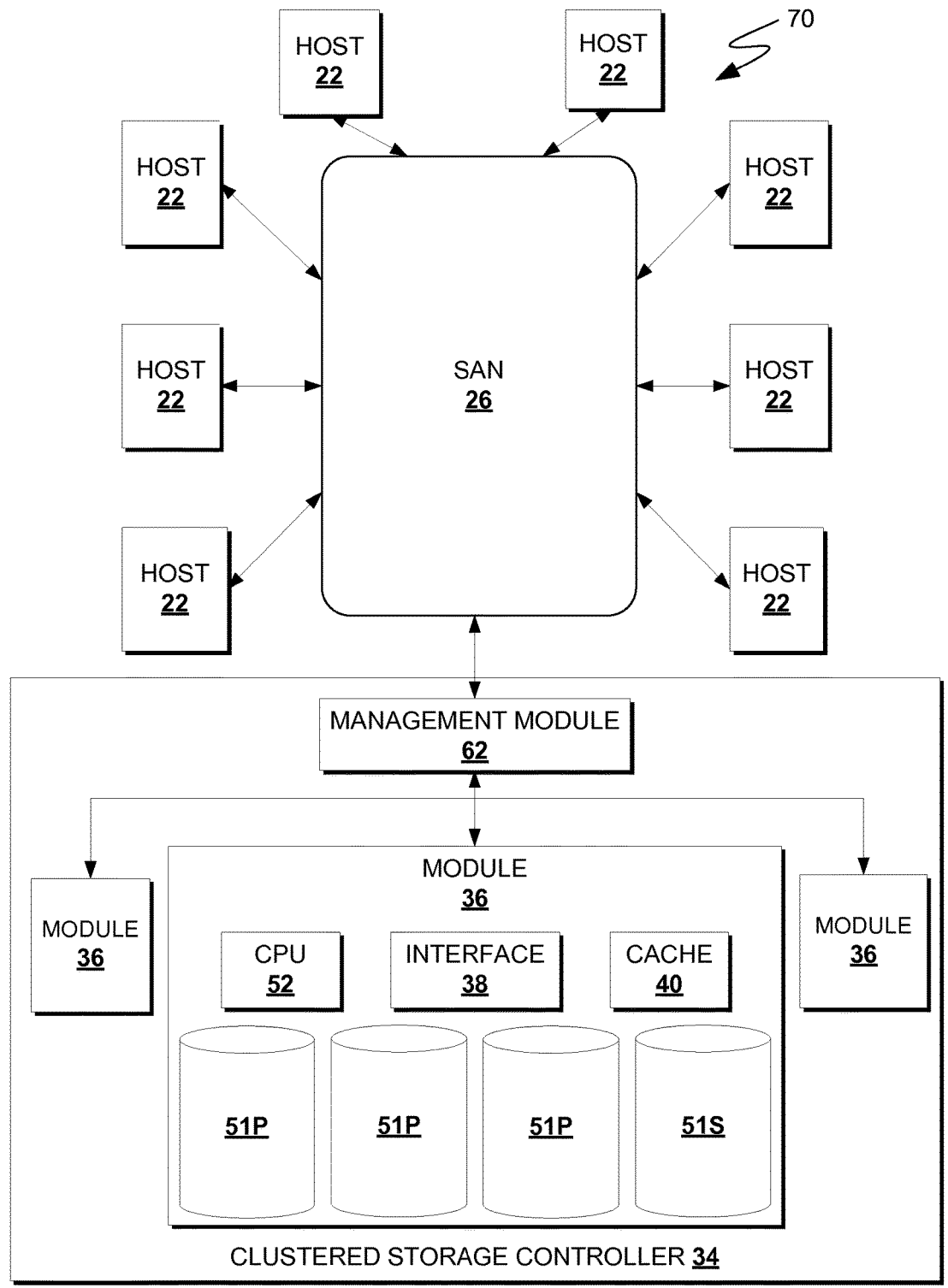
FIG. 3 is a block diagram that illustrates a storage system wherein storage modules generate redundant data, in accordance with an embodiment of the present disclosure.

FIGS. 2 and 3 depict embodiments wherein storage devices 50 include a combination of fast access time mass storage devices and slow access time mass storage devices. User data is stored on the fast access time mass storage devices and redundant data is stored on the slow access time mass storage devices, in accordance with various embodiments of the disclosure.

FIG. 2 is a block diagram that schematically illustrates storage subsystem 60. Storage subsystem 60 includes clustered storage controller 34 and one or more host computers 22 connected over SAN 26, in accordance with an embodiment of the present disclosure.

Clustered storage controller 34 controls one or more primary storage modules 37P and one or more secondary storage modules 37S. FIG. 2 illustrates an embodiment having a single secondary storage module 37S for illustrative simplicity. Primary storage modules 37P control one or more storage devices 50 that are fast access time mass storage devices (e.g., primary storage media 160 as discussed hereafter with respect to FIG. 4). Secondary storage module 37S controls one or more storage device 50 that are slow access time mass storage devices (e.g., secondary storage media 170 as discussed hereafter with respect to FIG. 4). In addition to storage modules 37P and 37S, storage controller 34 includes management module 62 that is configured to manage storage modules 37P and 37S. Management module 62 includes management processor 64 and cache 66. In operation, management module 62 receives data from one or more host computers 22. Management processor 64 executes storage logic 152, as described herein with reference to FIG. 5, to allocate the data to storage modules 37P and 37S. In some embodiments, management module 62 allocates user data to primary storage modules 37P and redundant data to secondary storage module 37S based, at least in part, on metadata that identifies the data as user data or redundant data. In other embodiments, management processor 64 generates redundant data from user data received from one or more host computers 22 and allocates the user data to primary storage modules 37P and the redundant data to secondary storage module 37S. User data is allocated to storage modules 37P, and redundant data is allocated to secondary storage module 37S, in accordance with a resilient storage scheme that is not a limitation of the present disclosure. Storage modules 37P and 37S allocate user data and redundant data to their respective storage devices 50, in accordance with the resilient storage scheme.

Figure 4:
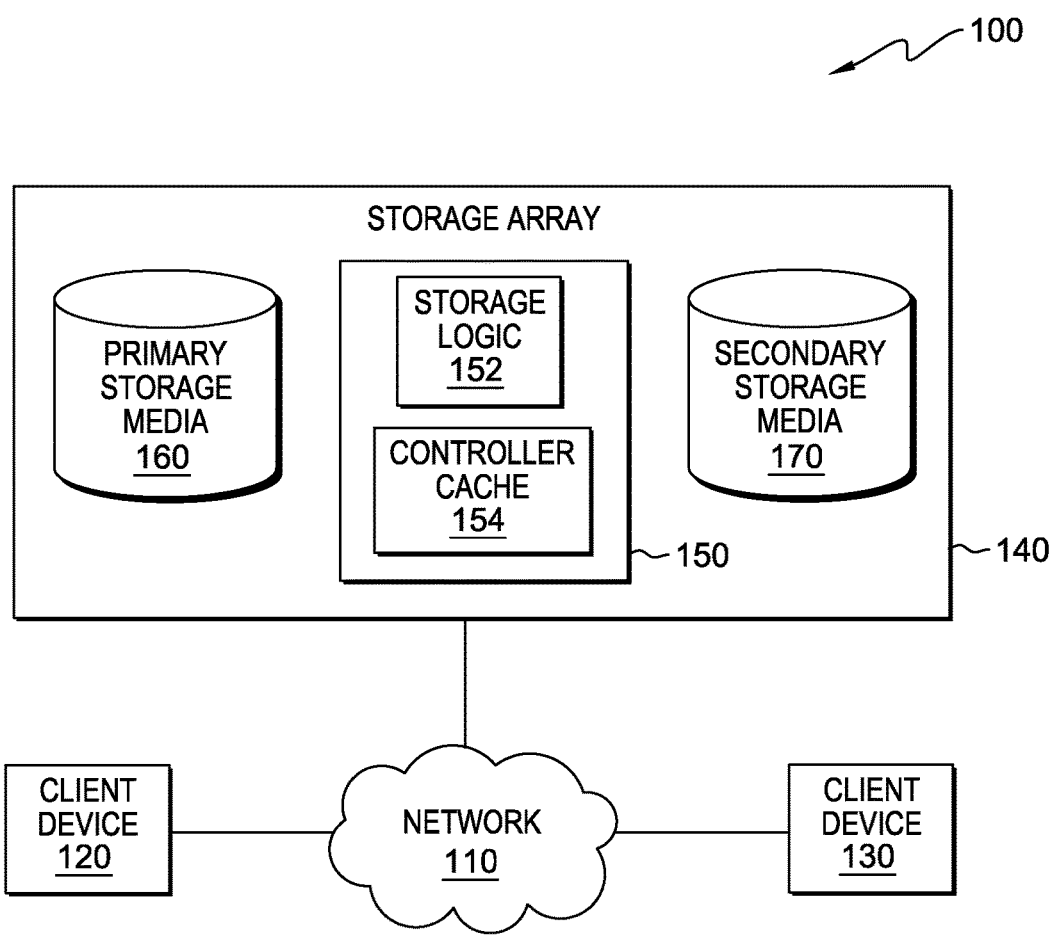
FIG. 4 is a block diagram illustrating a computing environment, in accordance with an embodiment of the present disclosure.

Persons skilled in the art will appreciate that storage subsystem 60 is one embodiment of computing environment 100 (discussed hereafter with respect to FIG. 4). For example, management module 62 and array controller 150 provide similar functionality to clustered storage controller 34 and storage array 140 respectively. Accordingly, cache 66 functions in a similar manner as controller cache 154. In addition, SAN 26 is analogous to network 110 and host computers 22 are analogues to client device 120 and client device 130. Host computers 22, client device 120, and client device 130 can similarly send I/O requests to clustered storage controller 34 and storage array 140 respectively.

FIG. 3 is a block diagram that schematically illustrates storage subsystem 70. Storage subsystem 70 includes clustered storage controller 34 and multiple host computers 22 connected over SAN 26, in accordance with an embodiment of the present disclosure.

Clustered storage controller 34 includes management module 62 and a plurality of storage modules 36. In operation, management module 62 receives data from one or more host computers 22. Management module 62 allocates the data to storage modules 36 in accordance with a resilient storage scheme that is not a limitation of the present disclosure. In some embodiments, for example, management module 62 divides the data into stripes and allocates a different stripe to each storage module of storage modules 36.

Each storage module of storage modules 36 includes CPU 52, interface 38, and cache 40 (as discussed herein with respect to FIG. 1) and controls one or more primary storage devices 51P, and one or more secondary storage device 51S. A single secondary storage device 51S is shown in FIG. 3 for illustrative simplicity. Primary storage devices 51P include one or more computer storage devices that are fast access time mass storage devices (e.g., primary storage media 160 as discussed hereafter with respect to FIG. 4). Secondary storage device 51S include one or more computer storage devices that are slow access time mass storage devices (e.g. secondary storage media 170 as discussed hereafter with respect to FIG. 4). In operation, CPU 52 executes storage logic 152, as discussed herein with respect to FIG. 5. In some embodiments, CPU 52 allocates user data to primary storage devices 51P and redundant data to secondary storage device 51S based, at least in part, on metadata that identifies data as either user data or redundant data. In other embodiments, CPU 52 generates redundant data from user data received from one or more host computers 22 and allocates the user data to primary storage device 51P and the redundant data to secondary storage device 51S. User data is allocated to one or more primary storage devices 51P, and redundant data is allocated to one or more secondary storage devices 51S, in accordance with the resilient storage scheme.

Persons skilled in the art will appreciate that storage subsystem 70 is one embodiment of computing environment 100 (discussed hereafter with respect to FIG. 4). For example, storage modules 36 and array controller 150 provide similar functionality to clustered storage controller 34 and storage array 140 respectively. Accordingly, cache 40 functions in a similar manner as controller cache 154. Persons skilled in the art will also appreciate that management module 62 can provide to clustered storage controller 34 some of the functionality that array controller 150 provides to storage array 140. SAN 26 and host computers 22 are analogous to respective components of computing environment 100, as discussed with respect to FIG. 2.

Processors 52 and 64 comprise general-purpose central processing units (CPU) or special-purpose embedded processors, which are programmed in software or firmware to carry out the functions described herein. The software may be downloaded to modules 36 and 62 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

FIGS. 1 through 3 depict specific embodiments of the present disclosure. Persons skilled in the art will understand that number and configuration of two or more different tiers of computer storage devices is not a limitation of the present disclosure. Data storage on heterogeneous arrays of computer storage devices will now be discussed in more general terms with respect to FIGS. 4 through 6.

FIG. 4 is a functional block diagram illustrating a computing environment, in accordance with an embodiment of the present disclosure. For example, FIG. 4 is a functional block diagram illustrating computing environment 100. Computing environment 100 includes storage array 140, client device 120, and client device 130, interconnected over network 110. Storage array 140 includes array controller 150, primary storage media 160, and secondary storage media 170. Array controller 150 includes storage logic 152 and controller cache 154. Array controller 150 is configured to receive client storage requests. Primary storage media 160 is configured to store user data. Primary storage media 160 may include one or more computer storage devices. Secondary storage media 170 is configured to store redundant data that is derived from user data. Secondary storage media 170 may include one or more computer storage devices. Primary storage media 160 may provide a higher QoS than secondary storage media 170. Primary storage media 160 may provide, separately or in combination, lower data read times, lower data write times, and less latency than secondary storage media 170.

In various embodiments, array controller 150 is a computing device that can be a standalone device, a server, a laptop computer, a tablet computer, a netbook computer, a personal computer (PC), a desktop computer, or a microcontroller. In some embodiments, array controller 150 may reside on client device 120, client device 130, or any computing device or combination of computing devices with access to primary storage media 160 and secondary storage media 170. In other embodiments, array controller 150, client device 120, and client device 130 represents a computing system utilizing clustered computers and components to act as a single pool of seamless resources. In general, array controller 150, client device 120, and client device 130 can be any computing device or a combination of devices with access to primary storage media 160 and secondary storage media 170, and with access to and/or capable of executing storage logic 152. Array controller 150 may include internal and external hardware components, as depicted and described in further detail with respect to FIG. 5.

In some embodiments, storage logic 152 may be stored on array controller 150. In other embodiments, storage logic 152 may reside on another computing device, provided that it can access and is accessible by each of primary storage media 160 and secondary storage media 170. In yet other embodiments, storage logic 152 may be stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between array controller 150, client device 120, and client device 130, in accordance with a desired embodiment of the present invention.

In some embodiments, array controller 150 stores an instance of storage logic 152. In this case, the instance of storage logic 152 includes the functionality and operability described herein in connection with storage logic 152. In some embodiments, the instance of storage logic 152 becomes active in response to receiving client storage requests. Client storage requests may originate from one of client device 120, client device 130, or any computing device or a combination of devices with access to storage array 140. Controller cache 154 may store client storage requests. In one such embodiment, storage logic 152 may determine if data in a client storage request is user data and/or redundant data. Client storage requests may include metadata that enables storage logic 152 to determine if data is user data or redundant data. In response to determining that data in a client storage request is user data, storage logic 152 may operate to cause primary storage media 160 to store the user data. In response to determining that data in a client storage request is redundant data, storage logic 152 may operate to cause secondary storage media 170 to store the redundant data. Storage logic 152 may operate to store redundant data on secondary storage media 170 even if primary storage media 160 includes enough free space to store redundant data. Storing redundant data on secondary storage media 170, even if primary storage media 160 includes enough free space to store the redundant data, may limit the number of erasures incurred on primary storage media 160 in order to make room for additional user data. This technique may increase the amount of user data that may be written to primary storage media 160 over the lifespan of individual computer storage devices included in primary storage media 160. If primary storage media 160 does not include enough free space to store user data, storage logic 152 may operate to cause secondary storage media 170 to store user data. User data may be transferred from secondary storage media 170 to primary storage media 160 if free space on primary storage media 160 becomes available. Storage logic 152 may operate automatically, without involvement from users of storage array 140.

In other embodiments, storage logic 152 may be configured to create redundant data from user data contained within client storage requests. In some embodiments, storage logic 152 may operate to create a mirror copy of user data contained in client storage requests. A mirror copy may be stored as redundant data on secondary storage media 170. For example, secondary storage media 170 may store one or more mirror copies of user data as part of a level one redundant array of independent disks (RAID, i.e. RAID-1). Various levels of RAID are known in the art, some of which are discussed in more detail below. In other embodiments, storage logic 152 may operate to copy and compress user data. Compressed user data may be stored on secondary storage media 170 as redundant data. In yet other embodiments, storage logic 152 may operate to generate error-correcting codes from user data. Secondary storage media 170 may store, as redundant data, error-correcting codes that are generated from user data.

In other embodiments, storage logic 152 may be configured to divide user data contained in client storage requests into stripes and calculate parity data from the stripes in accordance with an applicable level of RAID. Levels of RAID such as RAID-4, RAID-5, and RAID-6 include parity data on one or more computer storage devices. Storage logic 152 may operate to cause primary storage media 160 to store the stripes on one or more computer storage devices in accordance with the applicable level of RAID. Storage logic 152 may operate to cause secondary storage media 170 to store parity data as redundant data on one or more computer storage device in accordance with the applicable level of RAID.

In embodiments that include parity data, the parity data may be calculated from stripes of user data using an exclusive or (XOR) function. Parity data, however, may be calculated using any method known in the art. By this method, a parity bit may be calculated from two bits of user data. In some embodiments, primary storage media 160 may store two or more stripes of user data on a respective number of computer storage devices; secondary storage media 170 may store parity data. If one of the computer storage devices of primary storage media 160 fails, the inaccessible user data may be reconstructed using the XOR function from the remaining user data stored on primary storage media 160 and the parity data stored on secondary storage media 170. Because resiliency may be provided by calculating one parity bit from two bits of user data, parity data requires less storage space than a mirror copy of user data. As a result, embodiments of the present disclosure that store parity data on secondary storage media 170, may provide resiliency while requiring less storage space for redundant data than embodiments of the present disclosure that store mirror copies of user data on secondary storage media 170. Because secondary storage media 170 may include fewer computer storage devices or the computer storage device(s) may have less storage capacity, embodiments that are configured to store parity data may cost less to construct than embodiments that are configured to store mirror copies of user data.

Different types of storage arrays can have different levels of resiliency. In some cases, storage arrays with higher levels of resiliency may have lower levels of performance or are more costly to construct because they require a greater number of physical computer storage devices per logical computer storage device. For example, RAID-6 has a higher level of resiliency than RAID-0, but also includes more redundant data and requires at least two additional computer storage devices because RAID-6 includes two distributed parity blocks. Moreover, RAID-6 may require more processing power than RAID-0 because of the need to calculate parity data. RAID configurations, however, are merely a few examples of resilient configurations of computer storage devices that include redundant data. Data may be assigned to primary storage media 160 or secondary storage media 170 according to any resilient configuration of computer storage devices known in the art. A resilient configuration of computer storage devices may be selected based on the desired level of resiliency and performance. High levels of resiliency, however, may reduce performance as described above using RAID-6 as an example. Conversely, high levels of performance may reduce resiliency. The appropriate level of resiliency may be based on a mean time between failure (MTBF) specification or other reliability statistic of the respective storage media of primary storage media 160 and secondary storage media 170.

As is known in the art, calculating error-correcting codes, and to a lesser extent creating mirror copies, can reduce write speeds to computer storage devices. Embodiments of the present disclosure may acknowledge writes from one or more buffers or caches to achieve a desired QoS. For example, storage logic 152 may acknowledge a write to primary storage media 160 and/or secondary storage media 170 while data resides in controller cache 154 and before the data is written to primary storage media 160 and/or secondary storage media 170 in accordance with the operation of storage logic 152.

Similarly, storage logic 152 may acknowledge writes to primary storage media 160 before user data is written to primary storage media 160. In such embodiments, storage array 140 may include one or more buffers or caches. For example, storage array 140 may include one or more buffers or caches for use with primary storage media 160. Each computer storage device of primary storage media 160 may have sole use (among any computer storage devices of primary storage media 160) of a buffer or cache for use with primary storage media 160. In other embodiments, multiple computer storage devices of primary storage media 160 may share a buffer or cache for use with primary storage media 160. Storage array 140 may also include any combination of the aforementioned buffers or caches for use with primary storage media 160. An acknowledgment of a write to primary storage media 160 may be transmitted while user data is in any one of the aforementioned buffers or caches for use with primary storage media 160 and before the user data is written to primary storage media 160.

Storage logic 152 may also acknowledge writes to secondary storage media 170 before redundant data is written to secondary storage media 170. In some embodiments, storage array 140 may include one or more buffers or caches for use with secondary storage media 170. For example, each computer storage device of secondary storage media 170 may have sole use (among any computer storage devices of secondary storage media 170) of a buffer or cache for use with secondary storage media 170. In other embodiments, multiple computer storage devices of secondary storage media 170 may share a buffer or cache for use with secondary storage media 170. Storage array 140 may also include any combination of the aforementioned buffers or caches for use with secondary storage media 170. An acknowledgment of a write may be transmitted while redundant data is in any one of the aforementioned buffers or caches for use with secondary storage media 170 and before the redundant data is written to secondary storage media 170. Acknowledging writes to secondary storage media 170 while redundant data resides in a buffer or cache and before redundant data is written to secondary storage media 170 may reduce the latency that client device 120, client device 130, or any computing device or a combination of devices with access to storage array 140 perceives when writing data to storage array 140. Consequently, this technique may allow use of secondary storage media 170 in conjunction with primary storage media 160 without significantly affecting the QoS provided by primary storage media 160.

In some embodiments, each of primary storage media 160 and secondary storage media 170 is a storage system. A storage system may include one or more computer storage devices, microcontrollers, caches, buffers, storage media, storage arrays, or combinations thereof. The storage system may store data on magnetic hard disk drives, solid state hard drives, semiconductor storage devices, read only memory (ROM), erasable programmable read-only memory (EPROM), flash memory, or any other computer-readable storage media that is capable of storing digital information. Each of primary storage media 160 and secondary storage media 170 may be organized as a resilient array of storage media. For example, each of primary storage media 160 and secondary storage media 170 may be organized as a redundant array of independent disks (RAID), including without limitation RAID-0, RAID-1, RAID-5, RAID-6, RAID-10, RAID-0+1 or RAID-1+0, RAID-50, RAID-60, RAID-100, or any other RAID configuration known in the art. Alternatively, each of primary storage media 160 and secondary storage media 170 may be organized as any non-RAID array. For example, each of primary storage media 160 and secondary storage media 170 may be organized as concatenated drives, spanned drives, just a bunch of disks (JBOD), a massive array of idle drives (MAID), or any other resilient configuration of computer storage devices known in the art. Primary storage media 160 and secondary storage media 170 may include storage media that is chosen based on read speeds, write speeds, mean time between failure (MTBF) specifications, or any other reliability or performance statistic.

Figure 5:
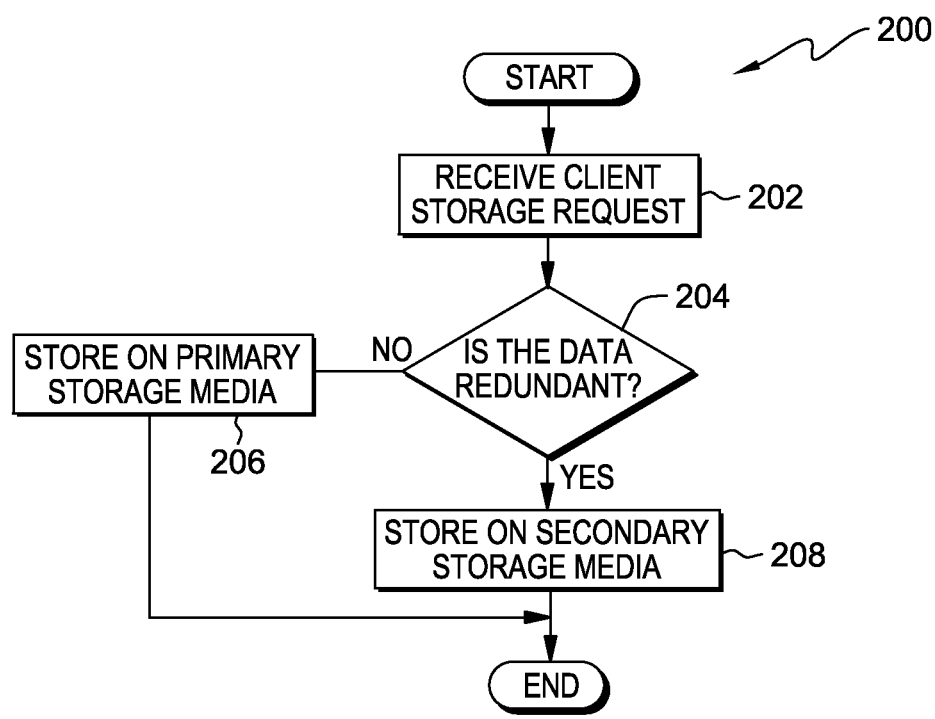
FIG. 5 is a flowchart depicting operations for storing data, on a computing device within the computing environment of FIG. 1, in accordance with an embodiment of the present disclosure.

FIG. 5 is a flowchart depicting operations for storing computer data, on a computing device within the computing environment of FIG. 4, in accordance with an embodiment of the present disclosure. For example, FIG. 5 is a flowchart depicting operations 200 of storage logic 152, on array controller 150 within computing environment 100.

In step 202, storage logic 152 receives a client storage request. In some embodiments, storage logic 152 receives client storage requests via network 110. In some embodiments client storage requests may originate from a user of client device 120 or client device 130. In other embodiments client storage requests may originate from a user of any computing device or a combination of devices with access to primary storage media 160 and secondary storage media 170. Client storage requests may also originate from the aforementioned devices via an automated process or a process without user involvement.

In decision 204, storage logic 152 determines whether the data is redundant. In one embodiment, metadata contained in client storage requests identifies data as user data or redundant data. Storage logic 152 may read the metadata and determine if the corresponding data is user data or redundant data. Storage logic 152 may operate automatically, without involvement from users of storage array 140.

In other embodiments, storage logic 152 may operate to generate redundant data from user data in client storage requests and store the redundant data to secondary storage media 170. Storage logic 152 may generate redundant data in the form of mirror copies or error-correcting codes as discussed in more detail above.

In step 206, responsive to determining if data in client storage requests is user data (decision 204, NO branch), storage logic 152 operates to cause primary storage media 160 to store user data. If primary storage media 160 does not include enough free space to store user data, storage logic 152 may operate to cause secondary storage media 170 to store user data.

In step 208, responsive to determining that data in client storage requests is redundant data (decision 204, YES branch), storage logic 152 operates to cause secondary storage media 170 to store redundant data. In step 208, storage logic 152 may operate to cause secondary storage media 170 to store redundant data even if primary storage media 160 has enough free space to store redundant data.

Figure 6:
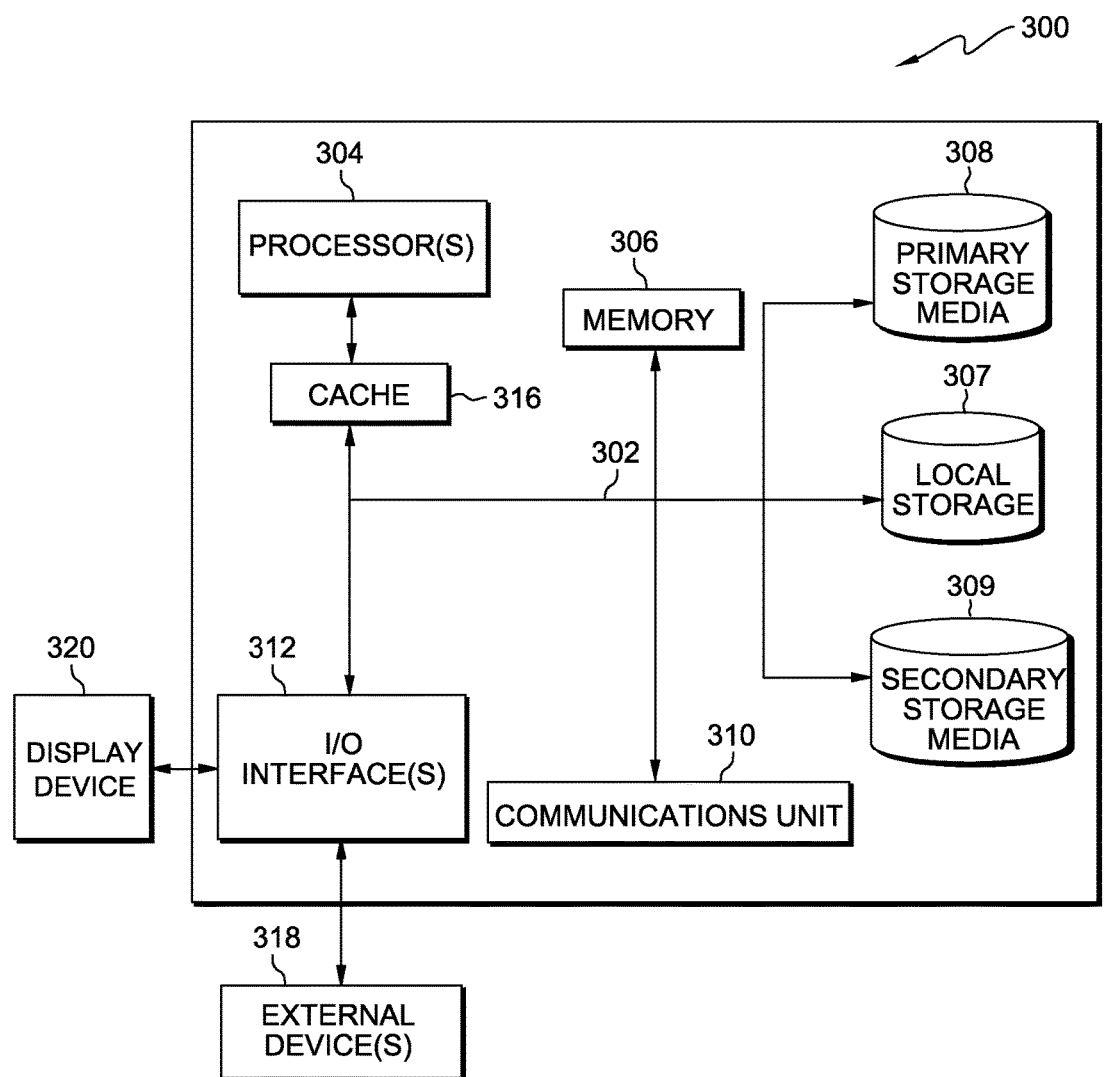
FIG. 6 is a block diagram of components of a computing device executing operations for storing data, in accordance with an embodiment of the present disclosure.

FIG. 6 depicts computer system 300, which is an example of a system that includes storage logic 152. Computer system 300 includes communications fabric 302, which provides communications between computer processor(s) 304, memory 306, local storage 307, primary storage media 308, secondary storage media 309, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306, local storage 307, primary storage media 308, and secondary storage media 309 are computer readable storage media. In this embodiment, memory 306 includes random access memory (RAM). In general, memory 306 can include any suitable volatile or non-volatile computer readable storage media. Cache 316 is a fast memory that enhances the performance of processors 304 by holding recently accessed data and data near accessed data from memory 306.

Program instructions, including storage logic 152, and data used to practice embodiments of the present invention may be stored in local storage 307, primary storage media 308, or secondary storage media 309 for execution by one or more of the respective processors 304 via cache 316 and one or more memories of memory 306. Local storage 307 may include one or more magnetic hard disk drives, solid state flash drives, semiconductor computer storage devices, read-only memory (ROM), erasable programmable read-only memory (EPROM), flash memory, or any other computer readable storage media that is capable of storing program instructions or digital information.

In some embodiments, primary storage media 308 includes one or more solid-state flash drives. Alternatively, or in addition to one or more solid-state flash drives, primary storage media 308 can include one or more magnetic hard disk drives, semiconductor computer storage devices, read-only memory (ROM), erasable programmable read-only memory (EPROM), flash memory, or any other computer readable storage media that is capable of storing program instructions or digital information.

In some embodiments, secondary storage media 309 includes one or more magnetic disk drives. Alternatively, or in addition to one or more magnetic disk drives, secondary storage media can include one or more solid-state flash drives, semiconductor computer storage devices, read-only memory (ROM), erasable programmable read-only memory (EPROM), flash memory, or any other computer readable storage media that is capable of storing program instructions or digital information.

The media used by local storage 307, primary storage media 308, and secondary storage media 309 may also be removable. For example, one or more removable solid-state flash drives may be used for primary storage media 308. Other examples of removable media include optical and magnetic disks, thumb drives, and smart cards that are inserted into a drive for transfer onto another computer readable storage medium that is also part of primary storage 308.

Communications unit 310, in these examples, provides for communications with other data processing systems or devices. In these examples, communications unit 310 includes one or more network interface cards. Communications unit 310 may provide communications through the use of either or both physical and wireless communications links. Program instructions and data used to practice embodiments of the present invention may be downloaded to local storage 307, primary storage 308, or secondary storage 309 through communications unit 310.

I/O interface(s) 312 allows for input and output of data with other devices that may be connected to each computer system. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto local storage 307, primary storage media 308, or secondary storage 309 via I/O interface(s) 312. I/O interface(s) 312 also connect to a display 320.

Display 320 provides a mechanism to display data to a user and may be, for example, a computer monitor.

It should be appreciated that FIG. 6 provides only an illustration of one implementation and does not imply any limitations with regard to the environments in which different embodiments may be implemented. Many modifications to the depicted environment may be made.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for storing computer data, the method comprising:
    responsive to determining, by one or more processors, that a first data includes user data, storing, by one or more processors, the user data to a first storage system, wherein the first storage system provides a first quality of service; and
    responsive to identifying, by one or more processors, redundant data in a second data, wherein the user data can be reconstructed based, at least in part, on the redundant data and a mathematical function, storing, by one or more processors, the redundant data to a second storage system, wherein the second storage system provides a second quality of service that is lower than the first quality of service provided by the first storage system.

2. The method of claim 1, wherein storing, by one or more processors, redundant data to the second storage system is performed if the first storage system has enough free space to store the redundant data.

3. The method of claim 1, wherein:
    determining, by one or more processors, that the first data includes user data is based on metadata that describes the first data.

4. The method of claim 1, further comprising creating the redundant data from the user data by applying the mathematical function to the user data wherein the user data can be reconstructed based, at least in part, on the redundant data.

5. The method of claim 4, wherein the user data can be reconstructed based on the redundant data in combination with a portion of the user data.

6. The method of claim 1, wherein the first storage system includes a first plurality of computer-readable storage media and the second storage system includes a second plurality of computer-readable storage media.

7. The method of claim 6, wherein the first plurality of computer-readable storage media includes at least one non-volatile solid-state drive and wherein the second plurality of computer-readable storage media includes at least one magnetic hard disk drive.

8. The method of claim 1, wherein storing the redundant to the second storage system is acknowledged while the second data resides in one or more buffers of the second system and prior to (i) destaging the redundant data from the one or more buffers and (ii) writing the redundant data to one or more computer readable storage devices of the second storage system.

9. A computer program product for storing computer data, the computer program product comprising:
    a computer readable storage medium and program instructions stored on the computer readable storage medium, the program instructions comprising:
    program instructions to determine if data includes user data;
    program instruction to store the user data to a first storage system, wherein the first storage system provides a first quality of service;
    program instructions to identify redundant data, wherein the user data can be reconstructed based, at least in part, on the redundant data and a mathematical function; and
    program instructions to store the redundant data to a second storage system, wherein the second storage system provides a second quality of service that is lower than the first quality of service provided by the first storage system.

10. The computer program product of claim 9, wherein the program instructions to store redundant data to the second storage system are performed if the first storage system has enough free space to store the redundant data.

11. The computer program product of claim 9, wherein the program instructions further comprise:
    program instruction to read metadata that describes the data, wherein the data includes user data if the metadata describes at least a portion of the data as user data.

12. The computer program product of claim 9, wherein the program instructions further comprise:
    program instructions to create the redundant data from the user data by applying the mathematical function to the user data.

13. The computer program product of claim 12, wherein the user data can be reconstructed based on the redundant data in combination with a portion of the user data.

14. The computer program product of claim 9, wherein storing the redundant data to the second storage system is acknowledged while the redundant data resides in one or more buffers of the second system and prior to (i) destaging the redundant data from the one or more buffers and (ii) writing the redundant data to one or more computer readable storage devices of the second storage system.

15. A computer system for storing computer data, the computer system comprising:
    one or more computer processors;
    one or more computer readable storage media;
    program instruction stored on the computer readable storage media for execution by at least one of the one or more processors, the program instructions comprising:
    program instructions to determine if data includes user data;

program instruction to store the user data to a first storage system, wherein the first storage system provides a first quality of service;

program instructions to identify redundant data, wherein the user data can be reconstructed based, at least in part, on the redundant data and a mathematical function; and program instructions to store the redundant data to a second storage system, wherein the second storage system provides a second quality of service that is lower than the first quality of service provided by the first storage system.

16. The computer system of claim 15, wherein the program instructions to store redundant data to the second storage system are performed if the first storage system has enough free space to store the redundant data.

17. The computer system of claim 15, wherein the program instructions further comprise:

program instruction to read metadata that describes the data, wherein the data includes user data if the metadata describes at least a portion of the data as user data.

18. The computer system of claim 15, wherein the program instruction further comprise:

program instructions to create the redundant data by applying the mathematical function to the user data.

19. The computer system of claim 18, wherein the user data can be reconstructed based on the redundant data in combination with a portion of the user data.

20. The computer system of claim 15, wherein storing the redundant data to the second storage system is acknowledged while the redundant data resides in one or more buffers of the second system and prior to (i) destaging the redundant data from the one or more buffers and (ii) writing the redundant data to one or more computer readable storage devices of the second storage system.

* * * * *